UnitedStates Patent Office 3,467,693
Patented Sept. 16, 1969

3,467,693
PROCESS FOR THE PRODUCTION OF ARYLIMINO-CHLOROCARBONYL CYANIDES
Engelbert Kühle, Bergisch Gladbach, and Bertram Anders, Cologne-Stammheim, Germany, assignors to Farbenfabriken Bayer Aktiengesellschaft, Leverkusen, Germany, a corporation of Germany
No Drawing. Filed Mar. 22, 1966, Ser. No. 536,300
Claims priority, application Germany, June 18, 1965,
F 46,369, Patent 1,224,306
Int. Cl. C07c *121/06;* A01n *9/20*
U.S. Cl. 260—465                                9 Claims

---

ABSTRACT OF THE DISCLOSURE

Process for producing arylimino-chlorocarbonyl cyanides by reacting the corresponding aryl isocyanide dichloride with about a 1:1 molar ratio of cuprous cyanide at a temperature of about 100–250° C.

---

It has been found that arylimino-chlorocarbonyl cyanides are obtained if optionally substituted aromatic isocyanide di-chloride are reacted with cuprous cyanide in the molar ratio of 1:1 at an elevated temperature.

Phenyl and naphthyl radicals are advantageously used as aromatic radicals in the isocyanide dichloride reactants. The following are mentioned as being advantageous as substituent of the aromatic radicals: halo, nitro, alkyl or alkoxy radicals. The halo radicals are for example, fluoro, chloro or bromo, and alkyl radicals or alkoxy radicals with 1–4 carbon atoms are advantageously used.

The following are mentioned, by way of example, as isocyanide dichlorides to be used for the process:

phenyl,
4-chlorophenyl,
4-bromophenyl,
4-fluorophenyl,
3,4-dichlorophenyl,
2,3-dichlorophenyl,
2,4,5-trichlorophenyl,
4-nitrophenyl,
2-chloro-4-nitrophenyl,
2-methyl-5-nitrophenyl,
2-methoxy-5-nitrophenyl,
4-butoxyphenyl,
3,4-dimethylphenyl,
2,4,6-trimethylphenyl,
4-tert.-butylphenyl,
2- or 4-methylphenyl and naphthyl isocyanide dichlorides.

The process is now explained by reference to the example of the reaction of 3,4 - dichlorophenylisocyanide dichloride with cuprous cyanide:

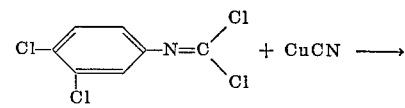
+ CuCN ⟶

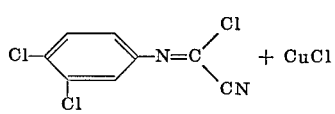
+ CuCl

The reaction takes place in the temperature range of from about 100° C. to about 250° C., advantageously from 150° C. to 200° C. It is expedient to work in the presence of an inert organic solvent, e.g. dichlorobenzenes or nitrobenzene. The sequence of the addition of the reaction components is not of decisive importance for the course of the reaction, but it is preferred to introduce the copper cyanide in the hot state into the solution of the isocyanide dichloride. The reaction period is from about 30 minutes to about 5 hours, and advantageously from 1 to 3 hours.

The batches are worked up in the usual way. It is extremely surprising that the arylimino-chlorocarbonyl cyanides which are obtained are thermally stable, so that they can if necessary even be purified by distillation. This was completely unexpected, in view of the instability of the addition products of carboxylic acid chlorides with isonitriles (Liebig's Annalen der Chemie 270, pages 297 and 316).

The new compounds which are obtainable according to the present process can be used as intermediate products for the preparation of plant-protection agents and even have an insecticidal action.

For example, 4-chloro-, 3,4-dichloro or 3-nitrophenyl-iminochlorocarbonyl cyanide, when used in a proportion of 0.2% by weight (1 part by weight of active substance, 1 part by weight of emulsifier of the alkylaryl polyglycol ether type and 3 parts by weight of dimethylformamide, diluted with water until the required concentration is obtained) cause a 100% extermination of flies (*Drosophila melanogaster*) and red spiders (*Tetranychus urticae*). The other compounds obtainable by the process of the invention also act in similar manner.

EXAMPLE 1

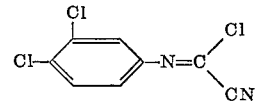

120 g. of 3,4 - dichlorophenylisocyanide dichloride are heated in 150 ml. of o-dichlorobenzene to a temperature of from 190° C. to 200° C. and, at this temperature, 45 g. of cuprous cyanide are added in portions in the space of one hour. The dark-coloured reaction mixture is heated for another hour and, after cooling, is filtered off with suction from the copper chloride. After the solvent has been distilled off, 66 g. of 3,4-dichlorophenylimino-chlorocarbonyl-cyanide of B.P. 149° C. to 154° C./9 mm. Hg are obtained.

In analogous manner, the following are obtained:
From 4-chlorophenyl-isocyanide dichloride:

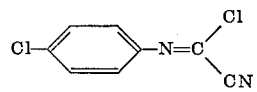

B.P. 130° C. to 135° C./11 mm. Hg.
From 3-nitrophenyl-isocyanide dichloride:

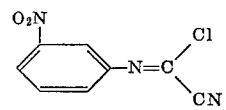

B.P. 175° C. to 180° C./10 mm. Hg.

EXAMPLE 2

87 g. of phenylisocyanide dichloride are heated in 150 ml. of o-dichlorobenzene to 190° C., and 45 g. of cuprous cyanide are added in portions. The resulting reaction solution becomes dark in colour. Heating is continued for another hour and, after cooling, the solution is filtered off with suction from the copper chloride. After the solvent has been distilled off 53 g. of phenylimino-chlorocarbonyl cyanide of B.P.: 124° C. to 128° C./24 mm. Hg are obtained by vacuum distillation.

By using p-tolylisocyanide dichloride, the following is obtained in a similar manner:

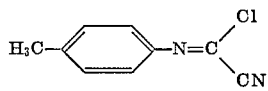

B.P.: 103° C. to 107° C./0.7 mm. Hg.

What we claim is:

1. A process for the production of aryliminochlorocarbonyl cyanides, which comprises reacting an aromatic isocyanide dichloride of the formula

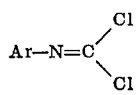

wherein Ar is a phenyl, naphthyl or corresponding substituted compounds thereof containing substituents selected from the group consisting of halo, nitro, lower alkyl and lower alkoxy, with cuprous cyanide in a molar ratio of about 1:1 and at a temperature of about 100–250° C.

2. The process of claim 1 wherein copper cyanide in the hot state is introduced into the isocyanide dichloride solution.

3. The process of claim 1, wherein the substituents of Ar are members selected from the group consisting of fluoro, chloro, bromo, lower alkyl of 1–4 carbon atoms, and lower alkoxy of 1–4 carbon atoms; effecting the reaction in an inert organic solvent.

4. The process of claim 1 wherein Ar is a member selected from the group consisting of phenyl, chlorophenyl, bromophenyl, fluorophenyl, dichlorophenyl, trichlorophenyl, nitrophenyl, chloro-nitrophenyl, methylnitrophenyl, methoxynitrophenyl, butoxyphenyl, dimethylphenyl, trimethylphenyl, tertiary-butylphenyl, methylphenyl and naphthyl; the reaction being effected at a temperature of about 150–200° C., in an inert organic solvent.

5. The process of claim 3 wherein the organic solvent is a member selected from the group consisting of o-dichlorobenzene and nitrobenzene.

6. The process of claim 4 comprising heating about 120 gm. of 3,4 - dichloro - phenylisocyanide dichloride in o-dichlorobenzene to a temperature of about 190°–200° C., slowly adding a reactive amount of cuprous cyanide, and thereafter recovering the resulting 3,4-dichlorophenylimino-chlorocarbonyl cyanide product.

7. The process of claim 6 wherein about 120 gm. of 4 - chlorophenyl - isocyanide dichloride is utilized to obtain the corresponding monochlorophenyliminochlorocarbonyl cyanide.

8. The process of claim 6 wherein about 120 gm. of 3 - nitrophenyl - isocyanide dichloride is utilized to obtain the corresponding mononitrochlorophenyliminochloro-carbonyl-cyanide.

9. The process of claim 4 wherein about 87 gm. of phenylisocyanide dichloride is heated in o-dichlorobenzene to a temperature of about 190° C., slowly adding a reactive amount of cuprous cyanide, and thereafter recovering the resulting phenyl-imino-chlorocarbonyl cyanide.

References Cited

Chemical Abstracts, 1966, vol. 65, pp. 18536 and 20071.

CHARLES B. PARKER, Primary Examiner

S. T. LAWRENCE III, Assistant Examiner

U.S. Cl. X.R.

71—105; 260—566; 424—304